Figure 1:
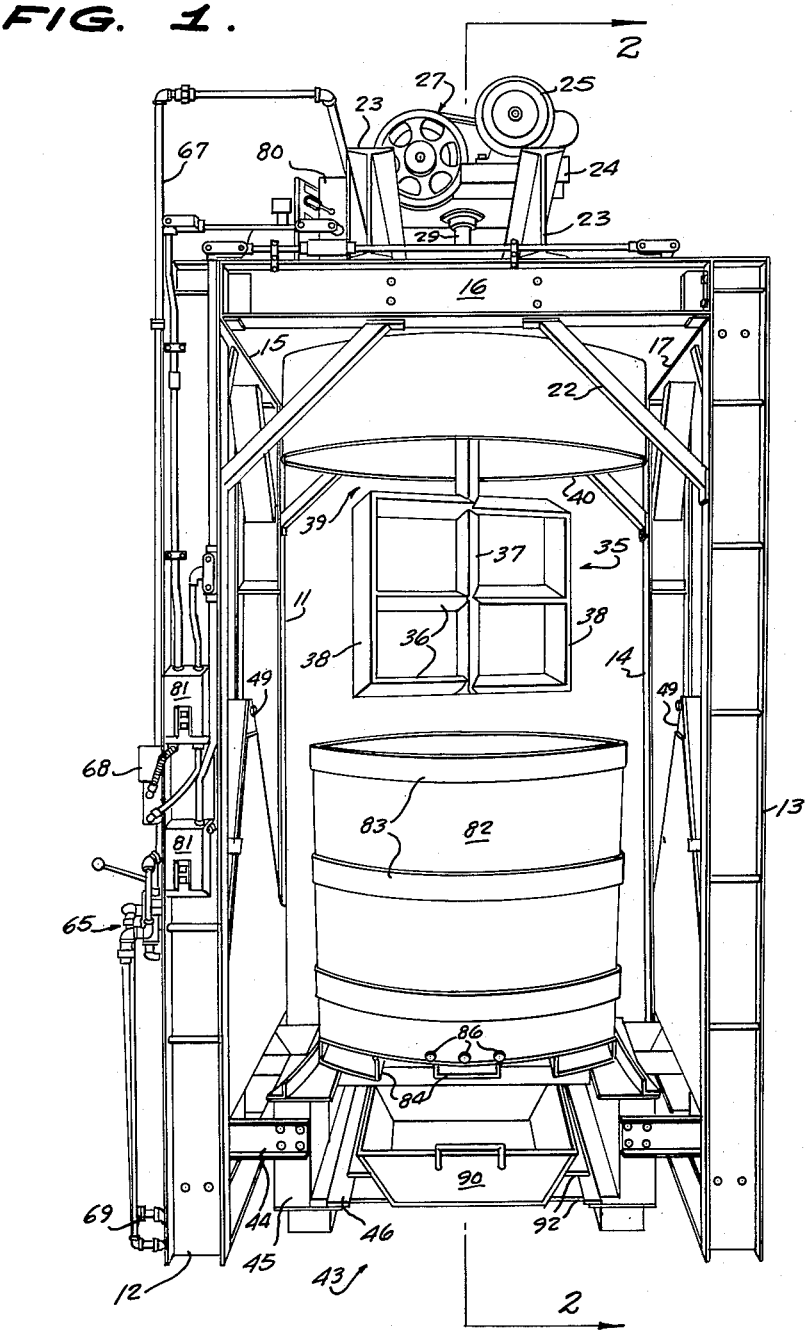

Aug. 3, 1965  M. G. AMDUR ETAL  3,198,505
METAL RECOVERY APPARATUS
Filed Dec. 20, 1962  6 Sheets-Sheet 3
FIG. 3.
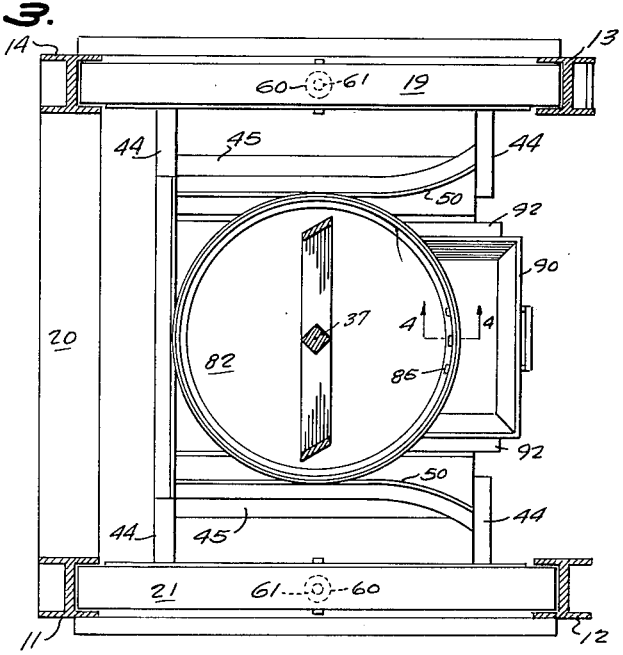
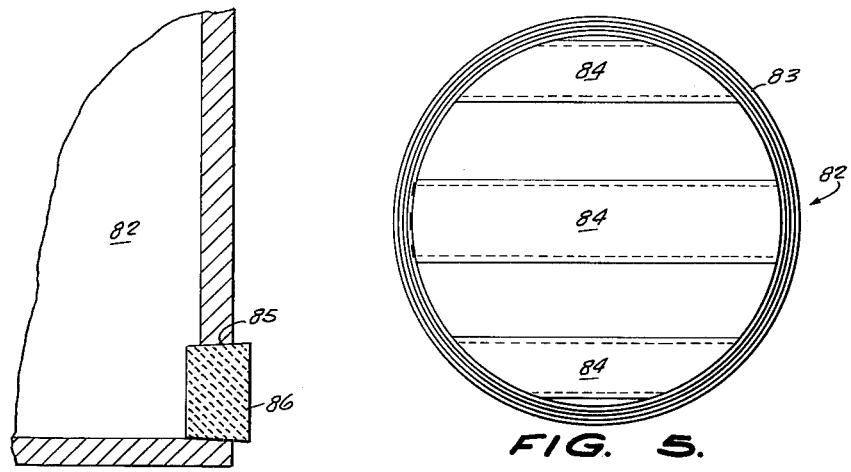
FIG. 4.  FIG. 5.
INVENTORS
MILTON G. AMDUR,
CLARENCE D. NISSLEY,
J. C. RISNER,
JOSEPH M. SANSONE,
BY
McMorrow, Berman + Davidson
ATTORNEYS.

Aug. 3, 1965    M. G. AMDUR ETAL    3,198,505
METAL RECOVERY APPARATUS
Filed Dec. 20, 1962    6 Sheets-Sheet 4
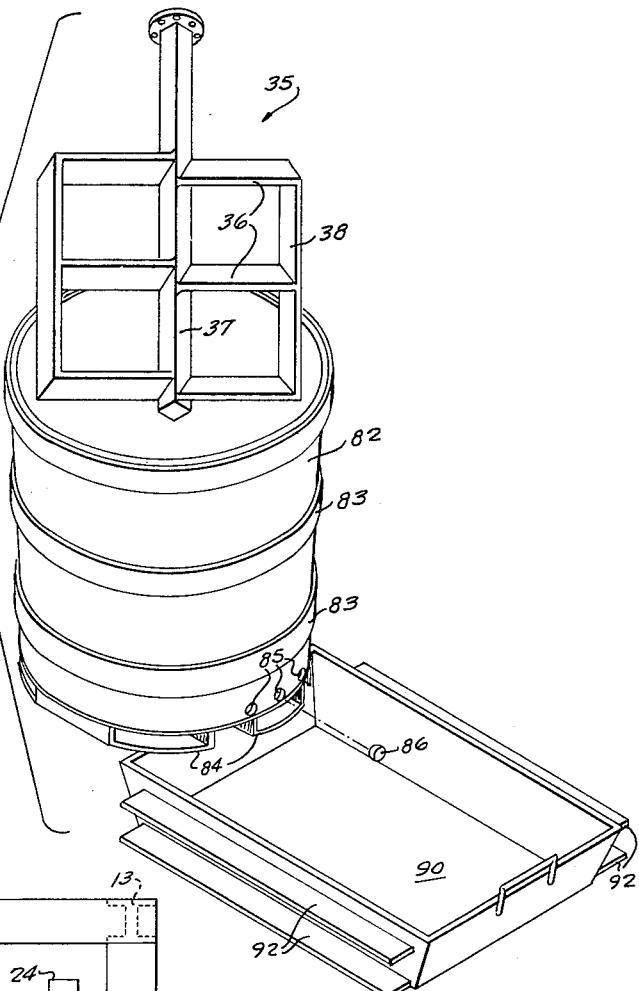
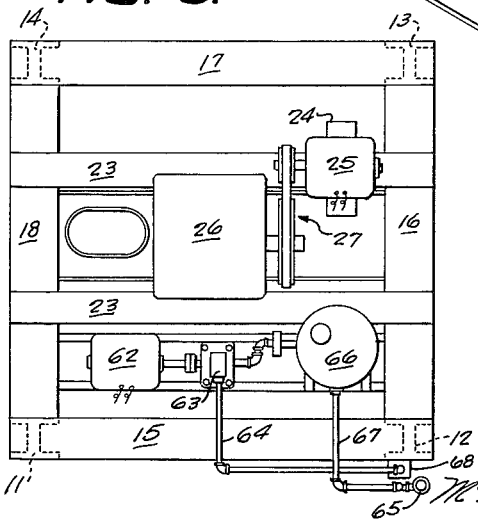
INVENTORS.
MILTON G. AMDUR,
CLARENCE D. NISSLEY,
L. C. RISNER,
BY JOSEPH M. SANSONE,
McMorrow, Berman + Davidson
ATTORNEYS.

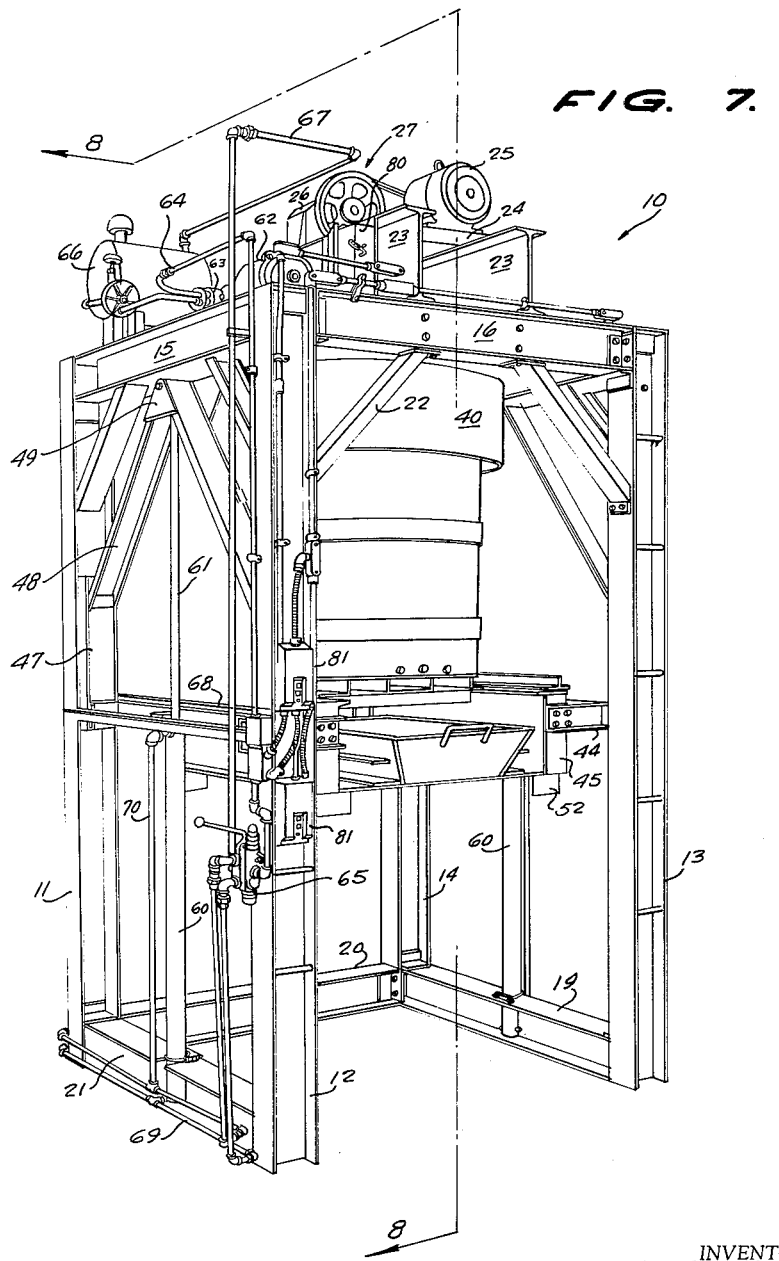

3,198,505
METAL RECOVERY APPARATUS
Milton G. Amdur, Clarence D. Nissley, J. C. Risner, and Joseph M. Sansone, Marietta, Pa., assignors to Metal Reclaiming Associates Inc., Marietta, Pa., a corporation of Pennsylvania
Filed Dec. 20, 1962, Ser. No. 246,038
5 Claims. (Cl. 266—37)

This invention relates in general to a metallurgical recovery apparatus and more particularly to a novel apparatus for recovering pure molten metal entrained in hot dross skimmings, such as are attendant with the melting and refining of aluminum and zinc, for example.

When such melting and refining operations are performed in open furnaces such that the surfaces of the melts are exposed to air, films of oxides, nitrides, and other non-metallic impurities are formed and gradually accumulate on the surface of the molten charges. This build up is commonly termed "dross" and floats on the surface of the melt and entraps considerable quantities of pure metal in the form of small particles or globules as a result of the necessary stirring or agitation of the melt. This dross must be periodically skimmed off and removed from the melt to prevent the formation of inclusions in the cast and wrought metal products to be eventually fabricated. The amount of free metal entrained in the dross may vary from 30 to 95% of the total weight of the dross, and represents a considerable waste if the dross skimmings are merely discarded.

If a quantity of hot dross is skimmed from the surface of a melt and simply allowed to stand in a container, some of the entrained metal particles will work free and settle to the bottom of the container, where they may be easily recovered by draining them off. Only a very low percentage of the free metal can be recovered in this manner, however, and the majority of it remains mixed in with the pasty, mud-like mass of dross. In addition, when the hot dross is exposed to air an exothermic reaction takes place as the molten metal globules entrained in the dross begin to oxidize the release substantial quantities of heat. This reaction is self-sustaining and, if allowed to continue unchecked, will consume nearly all of the free metal present in the dross.

It can be clearly seen that substantial savings and economy of operation can be effected if the free metal entrained in dross skimmings can be recovered, and this problem has been the subject of much concern in the metallurgical industry, particularly with respect to the melting and refining of aluminum and zinc metals and alloys. Several methods of recovery have been developed in the past as described below, but all possess certain inherent disadvantages which are largely overcome by the novel apparatus of this invention.

In one of the prior art methods, the dross is rapidly cooled to ambient temperature, crushed and pulverized in a ball mill, and then pass through an agitated sieve or screen to sort out the larger metal particles. This method of mechanical recovery avoids the problems attendant with the handling of hot dross, but is inefficient since most of the free metal in the dross is in the form of very fine particles which are virtually impossible to sort out by screening. In another recovery process the hot dross is stirred into a heel of molten metal (of the same kind as that entrained in the dross) which liquefies and absorbs the free metal particles. The efficiency of this process is very low, however, since in agitating the dross into the molten metal heel, nearly as much metal is beaten into the dross as is removed. In a similar process a fused salt bath is substituted for the molten metal heel, sodium chloride being most commonly employed due to its low cost. Once again, the recovery ratio obtained with this process is quite low, due largely to the fact that common salt fails to attack the oxide coatings on the small droplets of metal entrapped in the dross. A further disadvantage attendant with the use of a salt bath stems from the fact that the melting temperature of salt is so high i.e., approximately 1500° F., that the quality of the metal recovered therefrom is impaired. The high temperatures also result in undesirable fumes and deterioration of the furnace linings.

According to a more recently proposed process, hot aluminous dross is placed in an inclined rotatable drum open to the air and burning is induced by addition of suitable salts if the dross has not ignited by itself. The drum is slowly rotated about its inclined axis and the recovered aluminum is drained off through a tap hole at periodic intervals. The exothermic reaction is necessary to maintain the dross and entrapped metal in a molten state, but, as described above, results in the consumption of considerable quantities of the free metal, thus lowering the average recovery to around 60% of the entrapped aluminum. In addition, it is difficult to control the drum temperature when employing this process, and generally it rises to well above 1500° F., with the above-noted disadvantages thereof. The efficiency of this process may be somewhat improved by providing a non-oxidizing atmosphere in the drum, such as aluminum chloride, and supplying the necessary heat externally. The cost of the additional heat however, as well as that of an aluminum chloride generator, renders this process prohibitively expensive in relation to the amount of free metal recovered.

The latest method of recovering aluminum metal trappings from dross skimmings involves tumbling together a granular flux of sodium chloride, potassium chloride, and a fluoride-containing compound with aluminous dross in a rotary furnace, heating the mixture to liquefy the flux, and generally rolling the furnace to allow the droplets of metal to agglomerate in a pool. While relatively high recovery ratios are claimed for this method, the cost of the necessary constituents and apparatus is exceedingly high and the method is practical only for large scale operations.

This invention proposes a simple, relatively inexpensive apparatus which may be advantageously used to recover a high percentage of the pure molten metal entrained in hot dross skimmings and which is free of the many disadvantages inherent in the prior art. A practical embodiment of the apparatus contemplated by this invention comprises a box-like frame formed of suitably joined steel I beams or other rigid structural members having a power driven, rotary stirrer depending downwardly from and mounted on the top of the box frame. Slidably mounted with the frame directly beneath the stirrer is a hydraulically operated, vertically movable platform which is adapted to receive a reinforced dross drum and a recovery tray. The tray is carried immediately beneath the tap holes in the bottom of the drum on the base of the platform, while the drum is carried on an opposed pair of flare tracks that are designed to center it in the proper position when it is brought into place. A circular shield surrounds the stirrer at the top of the frame and is designed to enclose the open end of the dross drum when the latter is elevated into the agitating position at the raised level of the platform. The shield is provided with a fume venting stack in its top cover.

In operation, a charge of hot dross is skimmed or raked from the surface of a melt in a refining furnace and placed in a dross drum. The drum is conveyed to the recovery apparatus by any suitable means such as a fork-lift truck, for example, and placed on the flared tracks provided therefor on the movable platform, which is initially in its lowered position. The tap holes in the drum are of course fitted with knock out type closure plugs to contain the charge of hot dross. A recovery tray is positioned on the platform beneath the drum and the platform is elevated, thus submerging the stirrer in the dross and enclosing the top of the drum within the vented shield. Power is supplied to the stirrer causing it to rotate and agitate the mixture of dross and entrapped particles of free metal. The agitation breaks down the oxide and nitride barriers in the dross and the metallic particles are attracted to each other and agglomerate, settling to the bottom of the drum in a pool of pure molten metal. One of the tap hole closure plugs is then knocked out allowing the recovered molten metal to drain from the drum and into the recovery tray, which may then be removed and carried back to the refining furnace where the recovered metal is returned to the original melt. The pure metal may be tapped from the drum in this manner several times during each recovery operation.

By reason of the fact that the hot dross skimmings are treated immediately, rather than permitting the entrapped metal to burn exothermically over a prolonged period of time, recovery rates in the order of 90% are commonly obtained with this apparatus. The economy of the recovery operation is enhanced owing to the ease of handling attendant with the apparatus, which results in considerable savings in time and labor as compared with previous recovery techniques. No special fluxes or other materials need be added to the dross and the overall apparatus requires a minimum or floor space, occupying approximately 36 square feet with a height of 11 feet.

It is a primary object of this invention to provide a novel apparatus for recovering pure molten metal entrapped in hot dross skimmings.

It is a further object of this invention to provide such an apparatus which is rugged, inexpensive, safe to operate, and which results in recovery rates of up to 90% by preventing the consumption of the entrapped metallic particles through prolonged exothermic burning.

It is a further object of this invention to provide such an apparatus in the form of a box-like frame which carries a rotary stirrer depending downwardly from its top and a vertically movable platform within it positioned beneath the stirrer. The platform may be hydraulically operated and may also be specifically adapted to carry a dross drum and a recovery tray, and a vented shield may be provided to enclose the top of a dross drum on the platform when the latter is in its raised position.

Figure 2:
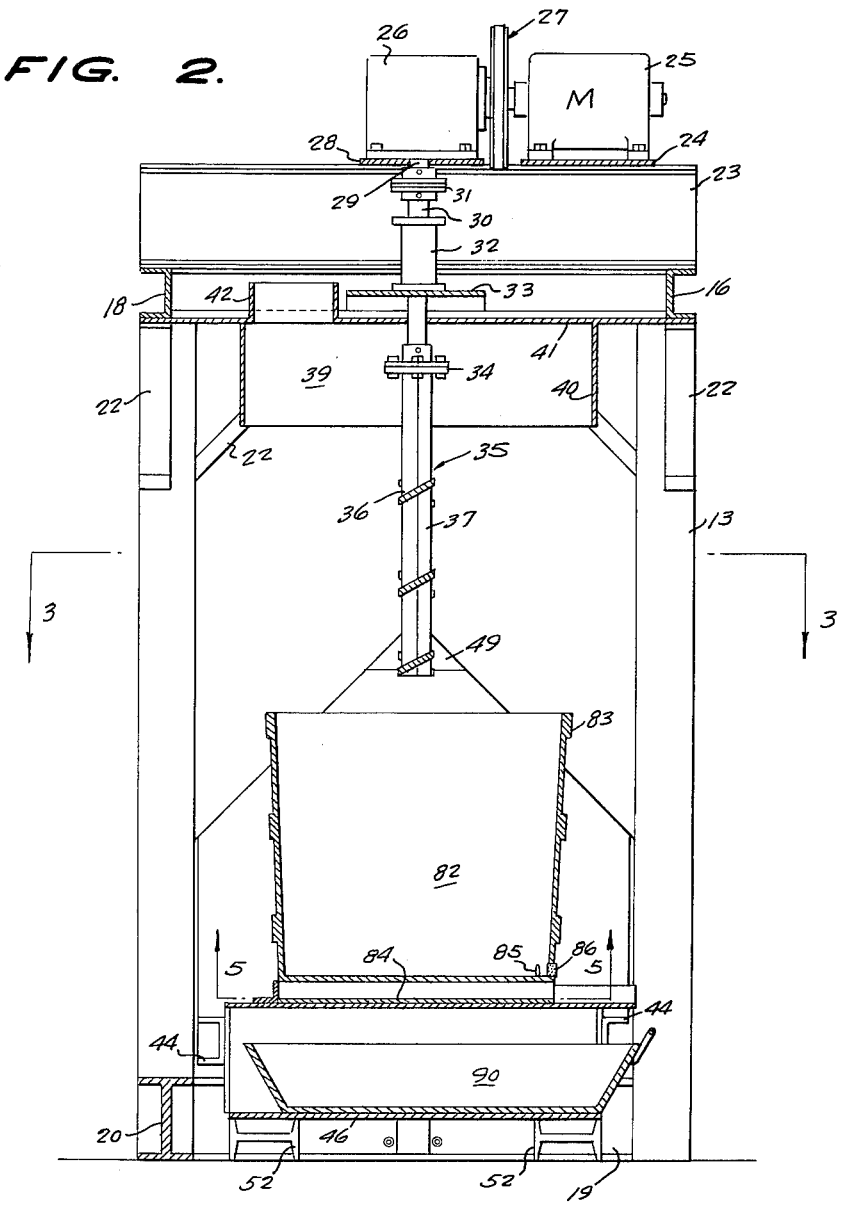
Figure 8:
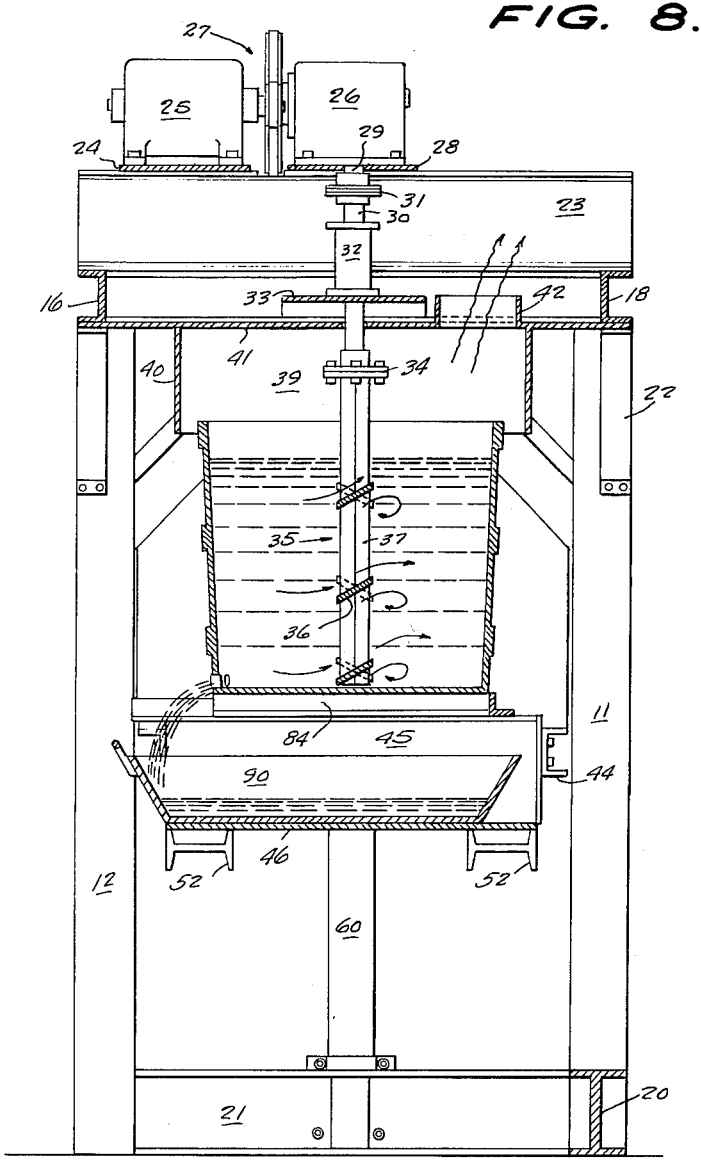

These and further objects of this invention will be readily apparent to those skilled in the metallurgical arts from a consideration of an exemplary embodiment of the invention described below in conjunction with the following drawings, in which:

FIGURE 1 is a front perspective view of the overall apparatus showing a dross drum and recovery tray in place on the lowered platform, FIGURE 2 is an elevational sectional view taken along line 2—2 of FIGURE 1, FIGURE 3 is a top sectional view taken along line 3—3 of FIGURE 2, FIGURE 4 is an elevational sectional view of the dross drum tap-out plug taken along line 4—4 of FIGURE 3, FIGURE 5 is a bottom sectional view of the dross drum taken along line 5—5 of FIGURE 2, FIGURE 6 is an exploded perspective view of the rotary stirrer, dross drum, and recovery tray, FIGURE 7 is a corner perspective view of the overall apparatus, FIGURE 8 is an elevational sectional view taken along line 8—8 of FIGURE 7, and FIGURE 9 is a top view of an alternate embodiment of the invention, showing a different hydraulic pump and accumulator arrangement.

Referring now to the drawings, wherein the same reference characters are used throughout the various figures to designate like elements, and particularly to FIGURES 1, 2, 7 and 8, the overall apparatus, designated generally at 10, comprises a box-like frame constructed of vertical I beams 11, 12, 13, and 14 and secured at the top to cross member I beams 15, 16, 17 and 18, and at the bottom to cross member I beams 19, 20 and 21. These main structural members of the frame may be fastened together in any convenient manner, such as by welding, riveting, or bolting, the latter expedient being shown in the drawings. Angular corner braces 22 are provided at each upper corner between the vertical I beams and the top cross members for added structural support. A pair of I beams 23 extend transversely across the top of the apparatus between cross members 16 and 18, and mounted on one of them is a motor support platform 24. An electric motor 25, which may operate on standard three phase 220/240 volt sixty cycle current, is bolted to the platform 24 and serves as the driving source for the rotary stirrer. Power from the motor 25 is delivered to a speed reducing gear transmission 26 through a belt and pulley arrangement 27, the transmission 26 being mounted on supporting plate 28 which extends transversely between I beams 23. Depending downwardly from the transmission 26 and driven thereby is an output shaft 29 which is secured to a shaft extension 30 by a coupling member 31. The shaft extension 30 is journaled in thrust bearing 32 which is mounted on support beam 33 extending transversely between and fastened to top cross members 15 and 17. Fastened to the free end of the shaft extension 30 via coupling member 34 is a rotary stirrer 35 comprising a series of angular radial blades 36 extending outwardly from a central shaft 37 and secured together at their free ends by strengthening members 38.

Surrounding the stirrer 35 at its upper end is a shield 39 having a circular side member 40 and a top cover 41. The cover 41 is provided with a ventilation stack 42 for exhausting any fumes that may build up within the shield 39, as best shown in FIGURE 8.

Positioned within the vertical frame members 11–14 is a movable platform 43 comprising supporting arms 44, side members 45, and a bottom shelf 46. The supporting arms 44 are secured to guide member 47 which are slidably engaged by the contours of the vertical I beams 11–14. Fastened to the upper ends of the guide members 47 are angle arms 48, the converging ends of which are joined together to form lifting crotches 49 for the platform 43. The tops of the side members 45 are provided with flared drum tracks 50, as best seen in FIGURES 1 and 3, and support members 51 extend transversely between the side members 45 for supporting a dross drum, as shown in the figures. The corners of the bottom shelf 46 are all provided with resting shoes 52, which are merely I beam sections welded in place to hold the platform 43 slightly above the floor when in its lowered position.

The hydraulic system shown in this preferred embodiment to raise and lower the movable platform 43 comprises a pair of hydraulic extension cylinders 60 whose bases are mounted in the bottom cross members 19 and 21, and whose extension rods 61 are positioned within the platform lifting crotches 49. Mounted on the top of the frame is an electric motor 62, which is of the same type as the stirrer drive motor 25, which drives a hydraulic pump 63, which in turn supplies working pressure to the hydraulic cylinders 60 through the pressure line 64 and the manually operated control valve 65. The hydraulic circuit employed here is of the closed loop type, the exhaust fluid being returned to an accumulator tank 66 through a return line 67. The energization of the motor 62 is controlled by a pressure sensitive relay 68 such that when the handle of the control valve 65 is depressed so as to raise the platform, the pressure drop in supply line 64 is sensed by the relay 68, which in turn closes an electrical supply circuit for the energization of motor 62. The action is, of course, reversed when the control valve handle is released, the pressure build up in supply line 64 causing the relay 68 to open, thus cutting off the supply of current to the motor 62. The remainder of the hydraulic circuit is completed in a conventional manner, there being provided a supply line 69 connected between the control valve 65 and the bottoms of the extension cylinders 60, and a return line 70 connected between the control valve and the tops of the cylinders.

The electrical circuits for the motors 25 and 62 are wired through a master switch and fuse box 80 and manually operated control boxes 81.

A dross drum 82 is provided with reinforcing bands 83 around its sides and transversely extending strengthening beams 84 across its bottom, as more clearly shown in FIGURES 5 and 6. The beams 84 form three enclosed pockets which are adapted to receive the blades of a forklift truck to facilitate easy handling. The beams 84 are also positioned such that they engage the raised sides of the flared tracks 50 of the platform when the drum is in its proper operating position. The drum is provided with three tap holes 85 adjacent its bottom which are fitted with disposable knock out plugs 86, as more clearly seen in the cutaway sectional view of FIGURE 4. Resting on the bottom shelf 46 of the platform 43 immediately beneath the tap holes 85 of the dross drum is a recovery tray 90 to the sides of which are secured flat extension members 92. The purpose of the extension members is to provide opposed longitudinal slots into which the blades of a fork-lift truck may be inserted for handling purposes.

In operation, a charge of hot dross is skimmed or raked from the surface of a refining furnace melt and deposited in a dross drum 82 which has its tap holes 85 closed off by knock out plugs 86. The blades of a fork-lift truck are inserted into the pockets formed by the strengthening beams 84 and the drum is quickly carried to the recovery apparatus 10 and placed on its support members 51 between the flared tracks 50, the platform 43 being initially in its lowered position. The recovery tray 90 is placed in its proper position on the bottom shelf 46, and the hydraulic control valve 65 is operated to raise the platform to its upper position as shown in FIGURES 7 and 8. As the platform is raised the rotary stirrer 35 is submerged in the hot dross mixture and the motor 25 is energized to cause rotation of the stirrer and the consequent agitation of the dross, as indicated by the turbulence arrows in FIGURE 8. The agitation of the dross causes the oxide and nitride barriers therein to break down, and the globules of entrapped metal rapidly agglomerate and settle to the bottom of the drum in a pool of pure molten metal. Any splashing or sputtering of the hot dross mixture is contained by the shield 39, and the fumes that are usually attendant with such an operation are vented off to the atmosphere through the stack 42. When the pool of molten metal becomes sufficiently large, which is usually after only a few seconds of agitation, one of the knock out plugs 86 is removed and the charge of metal is drained off through a tap hole 85 into the recovery tray 90. The knock out plug is replaced and the recovery tray is removed by a fork-lift truck and transported to the refining furnace where the charge of recovered metal is returned to the melt. At the completion of each recovery operation, which may require the drum to be drained several times, the platform 43 is lowered and the dross drum is carried away and emptied of its remaining contents of disposable dross prior to receiving a fresh charge from the melting furnace.

As can be seen from the above description, the overall recovery apparatus is relative simple to operate and is well adapted for the safe and easy handling of the hot dross drum and recovery tray. Since the hot dross skimmings are immediately processed after their removal from the furnace melt, thus reducing the exothermic burning of the dross and consequent consumption of the entrapped metal particles, recovery rates of up to 90% are commonly obtained with this apparatus, which has particular although not exclusive application to the recovery of molten zinc and aluminum from their respective dross skimmings in refinery operations.

FIGURE 9 shows an alternate embodiment of the present invention wherein the hydraulic system components, including the drive motor 62, the hydraulic pump 63, and the accumulator tank 66, are arranged in a slightly different manner on the top of the frame. With these components positioned as shown in FIGURE 9, the pressure and return line layouts can be somewhat simplified and their lengths shortened owing to the more proximate location of the hydraulic pump and accumulator tank of the control valve and pressure sensitive relay.

While there has been herein shown and described a preferred embodiment of the present invention, many minor variations and changes apparent to those skilled in the art may be made without departing from the spirit and scope of the invention, which is to be limited only by the following claims:

What is claimed is:

1. An apparatus for recovering molten metal from hot dross skimmings comprising:
   (a) a vertically disposed support frame having a stationary platform mounted on the top thereof and including vertical guide means,
   (b) a stirrer rotatably mounted on the stationary platform and depending downwardly therefrom,
   (c) first motive power means mounted on the stationary platform and operatively coupled to the stirrer for rotatably driving same,
   (d) a vertically movable platform mounted within the vertical guide means of the support frame and including first and second receiving means, the second receiving means being positioned immediately beneath the first receiving means,
   (e) second motive power means mounted on the support frame and operatively coupled to the movable platform for raising and lowering same,
   (f) an open-topped drum for containing hot dross skimmings having outlet tap means adjacent its bottom and adapted to be carried by the movable platform on the first receiving means,
   (g) a recovery tray for receiving molten metal drained from the drum tap means and adapted to be carried by the movable platform on the second receiving means, and
   (h) vented shield means mounted beneath the stationary platform surrounding the stirrer for enclosing the open top of the drum when the movable platform is in its raised position.

2. An apparatus for recovering molten metal from hot dross skimmings as defined in claim 1 wherein:
   (a) the stirrer includes a plurality of horizontally disposed, canted blades secured at their one ends to a central, vertically disposed shaft and secured at their other ends to vertically disposed strengthening members, and
   (b) the height of the bladed portion of the stirrer is at least one-half the height of the drum, whereby a uniform agitation of the dross skimmings is obtained.

3. An apparatus for recovering molten metal from hot dross skimmings as defined in claim 2 wherein the first receiving means comprises a pair of flared tracks and the second receiving means comprises a pair of parallel tracks.

4. An apparatus for recovering molten metal from hot dross skimmings as defined in claim 3 wherein the drum includes strengthening beams mounted on its bottom and adapted to cooperate with the flared tracks, and the recovery tray includes extension members mounted on its sides and adapted to cooperate with the parallel tracks.

5. An apparatus for recovering molten metal from hot dross skimmings comprising:
   (a) an upright, box-shaped support frame having a stationary platform mounted on the top thereof and including vertical guide means, (b) power driven agitating means rotatably mounted on the stationary platform and depending downwardly therefrom, (c) a power driven, vertically movable platform mounted within the vertical guide means of the support frame and including first and second receiving means, the second receiving means being positioned immediately beneath the first receiving means, (d) a drum for containing hot dross skimmings having outlet means adjacent its bottom and including beam members mounted on its bottom for cooperating with the first receiving means, and (e) a recovery tray for receiving molten metal drained from the drum outlet means and including extension members mounted on its sides for cooperating with the second receiving means.

References Cited by the Examiner

FOREIGN PATENTS 201,817   8/23   Great Britain.

OTHER REFERENCES

"Unit Operations of Chemical Engineering," McCabe and Smith, published by McGraw-Hill Book Company, 1956 (Chemical Eng. Series) page 300.

JOHN F. CAMPBELL, *Primary Examiner.*

JAMES H. TAYMAN, Jr., MORRIS O. WOLK, *Examiners.*